May 20, 1958 R. J. KOCH 2,835,440
FLASH READING INDICATING MEANS FOR REGISTERS
Filed Sept. 1, 1953 2 Sheets-Sheet 1
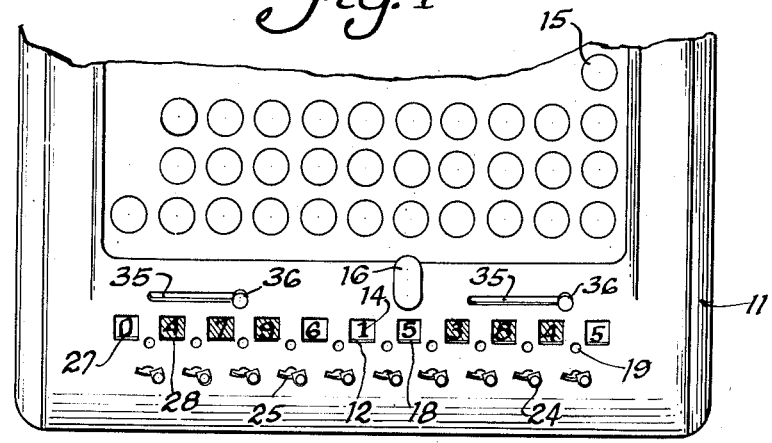
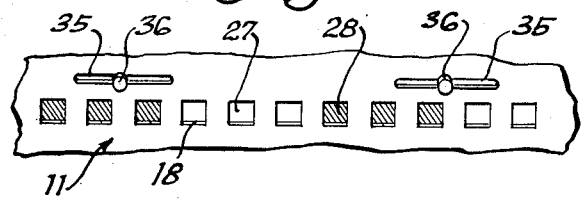
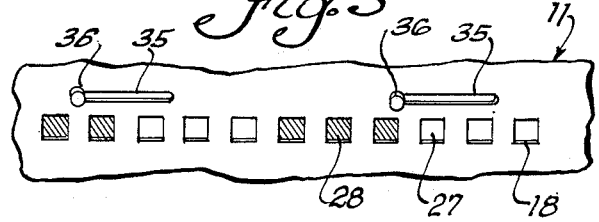
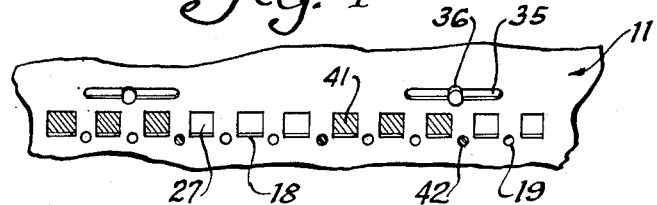
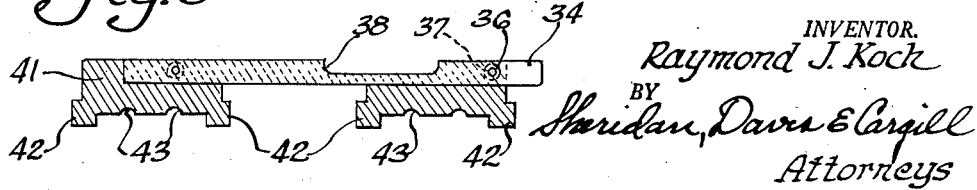
INVENTOR.
Raymond J. Koch
BY
Sheridan, Davis & Cargill
Attorneys

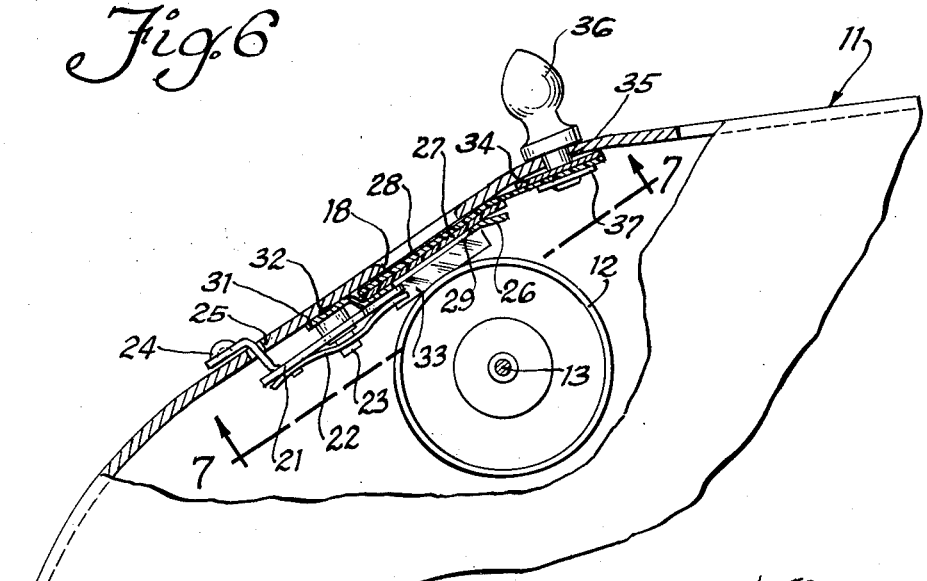
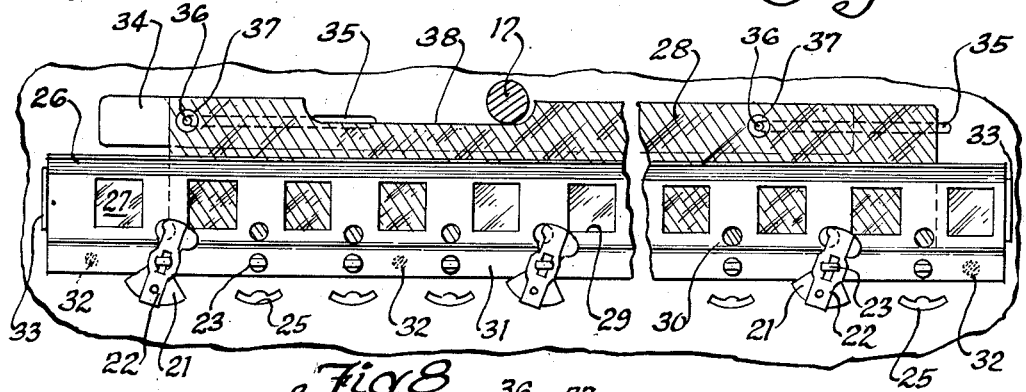
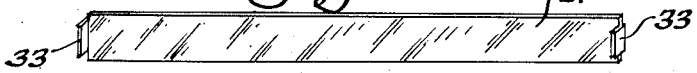
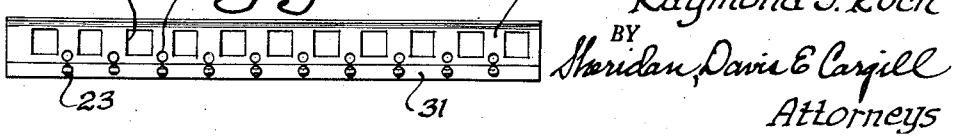

United States Patent Office 2,835,440
Patented May 20, 1958

2,835,440

FLASH READING INDICATING MEANS FOR REGISTERS

Raymond J. Koch, Winnetka, Ill., assignors to Comptometer Corporation, a corporation of Illinois Application September 1, 1953, Serial No. 377,896

10 Claims. (Cl. 235—1)

This invention relates in general to calculating machines or registers, and more particularly to visual indicating means cooperating with the indicia bearing elements or numeral wheels thereof to facilitate accurate flash reading of the values, answer or result registered thereon.

In business machines having visual register or accumulator wheels or digital numeral bearing elements, it has become common practice to differently color selected groups or sets of the numerals displayed by such elements or wheels, and to provide selectively operable decimal indicators adjacent thereto to assist the operator in reading the complete number or answer thereby registered. For example, it is customary in decimal type calculating machines to make the numerals on the accumulator wheels of the two lowest denominational orders a first color, such as black, those on the numeral wheels of the next three higher orders a second and different color, such as red, and those in each successively higher group or set of three orders alternately such first and second colors. This is somewhat similar to the use of a decimal point between the second and third order and commas between each successive group or set of three orders to the left of the decimal point when writing or printing a dollars and cents total, the commas being used to facilitate reading of the whole number from left to right by pointing off the thousands, millions, etc. Thus, in the example given, the numerals designating cents would be black, those representing units, tens and hundreds of dollars would be red, thousands of dollars would be registered by black numerals, and millions by red. Such arrangement is entirely satisfactory only if the colors employed are accurately distinctive and simple addition and subtraction problems are performed which require no shifting in location or denominational transposing of the decimal point. Whenever the latter is necessary, as in multiplication or division of numbers including decimal fractions, pointing off of the decimal point may be established visually by operation of the proper decimal indicator if the machine includes such mechanism, as that of U. S. Patent No. 2,585,578, issued February 12, 1952, but the resultingly different color groupings of the numeral indicia with reference to the different locations of the decimal point are so confusing as to materially slow up the reading of the registrations. And such coloring of the numerals presents serious manufacturing problems, because it is extremely difficult to maintain all of the indicia on a plurality of elements or numeral wheels the same selected color or shade, except where black is used, so as to insure uniform appearance, without requiring additional and expensive color comparison and selection steps. Even if such would produce satisfactory results in manufacturing, subsequent replacement of numeral wheels or indicia bearing elements would require return of a machine to the factory in order to insure proper color matching. This is of major importance where aluminum numeral wheels are employed which are anodized and dyed to provide the colored indicia, because the well-known advantages of using aluminum preclude returning to older constructions. But maintaining the shade of any selected color of dye, other than black, the same or constant for any length of time in a vat in day to day manufacturing is substantially impossible, and even successive batches of wheels, or wheels in the same batch, often unavoidably are subjected to the dye for slightly different periods of time, which will result in their numerals having different shades of color. In so manufacturing numeral wheels with red indicia, for example, the exercise of the greatest possible care has been found not to prevent a resulting range in color from a light red to a dark red.

A principle object of the present invention, therefore, is the provision of novel flash reading indicating means, in combination with an accumulator or register having a plurality of indicia bearing elements or numeral wheels, which effects the same visual pointing off of the registered result or color grouping of the different orders of the number accumulated as in the prior machines, while eliminating the necessity for coloring the indicia and enabling the use of identical or similar elements or numeral wheels in all orders of the machine. In the illustrated embodiments of the invention, this object is accomplished by using identical numeral wheels in all orders which have, for example, black indicia, and mounting a colored strip or strips of transparent material under the usual sight apertures or window in the machine casing or in a separate sight opening cover on the frame and above desired or selected numeral wheels. The numeral wheels of the units, tens and hundreds orders, as one group, and those of the millions, tens of millions and hundreds of millions orders, as another group, for example, thus may be visually separated from those of the thousands and decimal fraction orders by being given a green or any other selected color.

Another important object of the invention is to completely eliminate any possibility of confusion or mistake in flash reading of such indicia bearing elements by enabling the color grouping to be selectively shifted denominationally as an incident to selective pointing off or placement of the decimal point, so as to maintain the desired customary color separation between adjacent sets or groups of indicia bearing elements regardless of the particular location of the decimal point relative to the different orders of the register. In the illustrated embodiments of the invention, this is accomplished by mounting the colored strip or strips for selective movement transversely of the register for cooperation with different ones of the numeral wheels or indicia bearing elements.

Another object of the invention is to provide such flash-reading indicating means which, in addition to selectively coloring proper orders of the numerical indicia bearing elements, also affords visual indications of the proper location of the punctuation marks, both decimal point and commas, commonly employed in writing down the result of number registered.

Numerous other objects and advantages of the invention will be apparent as it is better understood from the following description, which, when taken in connection with the accompanying drawings, discloses a preferred embodiment thereof.

In the drawings:

Figure 1 is a top plan view of the forward portion of a calculating machine embodying the instant invention;

Fig. 2 is a fragmentary plan view, like Fig. 1, showing similar flash reading indicating means shifted laterally one denominational order to the left from the position illustrated in Fig. 1;

Fig. 3 is a view like Fig. 2 showing the indicating means denominationally shifted one further order to the left of its position of Fig. 2;

Fig. 4 is a view similar to Fig. 2 of a modified form of the invention in which the denominationally shiftable colored strip cooperates with certain indicator openings in the machine casing to afford visual indications of the proper location of the punctuation marks commonly employed in writing down the numbers registered;

Fig. 5 is a top plan view of the colored indicating slide employed in the modification of Fig. 4;

Fig. 6 is a detail vertical section, as seen from the right side of Fig. 1, and taken through the flash reading indicating means to show the details of construction and mounting thereof;

Fig. 7 is a bottom plan view of the indicating means of Fig. 6, with parts broken away and omitted, as seen substantially from the line 7—7 of Fig. 6;

Fig. 8 is a bottom plan view to reduced scale of the colored indicating slide employed in the modification of Figs. 6 and 7;

Fig. 9 is a bottom plan view of the colorless protective strip employed in the construction of Figs. 6 and 7; and Fig. 10 is a bottom plan view of the retaining frame employed in the construction of Figs. 6 and 7.

Referring more particularly to Figs. 1 and 6 of the drawings, reference numeral 11 indicates in general the casing of a calculating machine housing any desired and well-known mechanisms for actuating an accumulator which is illustrated as comprising a plurality of numeral wheels 12 rotatably mounted upon a transverse shaft 13, (Fig. 6) and each bearing digital indicia 14 (Fig. 1) circumferentially spaced on its periphery. As is well understood in the art, such a machine may also include various control means, such as the digit keys 15 (Fig. 1) and an error release key 16, which may correspond, respectively, to the digit keys 25 and error release key 186 of United States Letters Patent No. 2,570,068, issued October 2, 1951. The error release key 16 is illustrated herein only because provision must be made for clearance of its stem or lever 17 (Fig. 7) when incorporating the indicating means of the instant invention into a machine of that patent. The casing 11 is provided above the accumulator with a plurality of numeral wheel sight apertures 18 spaced laterally from each other and in visual alignment, respectively, with the several numeral wheels 12 of the accumulator. As in United States Letters Patent No. 2,585,578, issued February 12, 1952, previously referred to herein, decimal indicators may be included in such a machine, each of which comprises a decimal opening 19 in the casing 11 interposed between each adjacent pair of the numeral windows or sight apertures 18 and an indicator member 21 removably retained for rotation by a spring 22 on a pivot stud 23. The indicator member 21 is substantially identical to the member designated in Patent No. 2,585,578 by reference numeral 25, the spring 22 is the same as spring 28 in that patent, and reference numeral 23 also is employed therein to designate a pivot like that indicated herein by the same numeral. As in that patent, the upper surface of the rearwardly disposed end of each indicator member 21 preferably is given the same color as that of the exterior of the casing 11 and is provided at one side with a distinctively colored spot, designated in said patent by reference numeral 25c, which is normally out of view and may be moved into registration with the associated decimal opening 19 by movement of the forward end 24 (Figs. 1 and 6) to the left in Fig. 1 from its normal inoperative position therein illustrated. This forward end 24 of each indicator member 21 extends upwardly through a suitable arcuate slot 25 provided in the casing 11 similar to the slot designated in Patent No. 2,585,578 by reference numeral 12a.

The instant flash reading indicating means illustrated specifically in Figs. 6 through 10 constitutes an assembly mounted on the under side of the casing 11 and comprising a metal frame member 26, a stationary colorless and transparent strip of plastic or other suitable material 27 and a movable colored and transparent strip 28 of similar material. As best seen in Figs. 6, 7 and 10, the main body portion of frame member 26 is provided with a plurality of sight apertures 29 which register with the several sight apertures 18 in the casing, and decimal openings 30 registering with the decimal openings 19. As shown in Fig. 6, this main body portion of the frame member 26 is offset or spaced below the adjacent inner surface of the casing 11 a distance substantially equal to the sum of the thicknesses of the plastic strips 27 and 28. The forward portion of frame 26 comprises a flange 31 disposed in a plane substantially parallel to that of its main body portion and spaced upwardly therefrom to space the latter from the casing in the manner just described when such forward flange is in contact with the inner surface of casing 11 just forwardly of the sight apertures 18. This forward flange 31 carries the several pivot studs 23 for the decimal indicator members 21, the upper ends of which preferably are flush riveted to the flange. If desired, the flange 31 may be dimpled at those points through which studs 23 extend, or the apertures therein for the studs may be countersunk at their upper ends. As best seen in Figs. 6 and 7, the retaining frame member 26 preferably is secured to the casing 11 by spot welding at 32 at laterally spaced points along the forward flange 31, although any other suitable method of mounting the frame member 26 on the casing may be employed, such as by extending the pivot studs 23 upwardly through suitable apertures in the casing and flush riveting their upper ends to the latter.

The colorless plastic strip 27 (Fig. 9) rests upon and is supported by the frame 26 (Fig. 6) to overlie the several sight apertures 29, and is provided with down-turned ends 33 cooperating with the ends of the frame member to retain the same thereon (Fig. 7). The colorless or clear strip of transparent plastic material 27 thus underlies the windows or sight apertures 18 and the decimal openings 30 in casing 11 to substantially seal the same and protect the mechanism within the casing. The upper edge of the colored plastic strip 28 extends beyond the frame 26 and is secured to the under side of a transverse slide member 34 in any suitable manner. Secured to this slide 34 and extending upwardly therethrough and through suitable transverse slots 35 provided in the casing 11 are a pair of finger pieces 36 manually operable to selectively move the colored strip 28 laterally to the extent permitted by the slots 35. As shown in Fig. 6, each finger piece 36 has an enlarged shoulder contacting the upper surface of the casing 11 and is provided with a reduced lower end that extends through slide 34 and colored strip 28 and a suitable retaining washer 37, the lower end of this reduced portion of the finger piece being riveted or upset against the under surface of washer 37. It will be readily understood that any other suitable means may be employed for securing a finger piece, or the like, to the colored strip 28 in such manner as to enable selective transverse shifting of the colored strip from the exterior of the casing. In the modification illustrated in Fig. 6, the slide member 34 in contacting the under surface of the casing 11 prevents wear and damage of the colored strip in response to lateral shifting thereof, and the upper marginal portion of frame member 26 preferably is bent slightly downwardly to relieve pressure against the sliding strip and to facilitate removal and replacement of the strips 27 and 28 without requiring the removal of the supporting frame 26. As best seen in Figs. 7 and 8, the upper edge portions of the colored strip 28 and slide member 34 are cut away at 38 to provide clearance for the stem or lever 17 of the error release key 16. It is preferred that the upper portion of the strip 28 and the slide 34 be so dimensioned as to seal or close the slots 35 at all times.

Referring to Fig. 8, a central portion of the colored plastic strip 28 is shown therein as cut out or removed to provide a window 39, and in this particular embodiment of the invention, the length of the window 39 is one-third of the over-all length of the strip 28 and its width is slightly greater than the height of the sight apertures 18 and 29 in a direction front-to-rear of the casing 11. Such dimensioning of the colored strip 28 and its window 39 results in the end portions of the strip subtending or underlying two groups of three of the sight apertures 18 which are separated by a group or set of three of the sight apertures that are in registration with the window 39. This results, when the slide assembly, comprising the colored strip 28, slide member 34 and finger pieces 36, is in the extreme right-hand position of Fig. 1, as limited by contact of the finger pieces 36 with the right ends of their associated casing slots 35, in the numeral wheels and their exposed indicia 14 in the first, fifth, sixth, seventh, and highest or overflow orders being seen by the machine operator in their true color, and in coloring those in the second, third, fourth, eighth, ninth and tenth denominational orders of the machine, by virtue of the end portions of the colored strip 28 being in registration with such orders, to distinctively visually separate these latter two groups or sets of three numeral bearing elements from those of the remaining orders of the machine. This right-hand position of the flash reading indicator means illustrated in Fig. 1 is employed whenever the decimal point in the result or answer registered in the accumulator is disposed between the first and second lowermost orders of the latter. In such case, the operator customarily will move the forward end 24 of the right-hand indicator member 21 to the left from its normal position of Fig. 1 to provide the usual visual indication of such position of the decimal point through the right-hand decimal opening 19. It will be understood, of course, that this same rightmost position of the flash reading indicating means of Fig. 1 also is employed when the decimal point in the result or answer registered in the accumulator is disposed between the fourth and fifth or seventh and eighth denominational orders of the machine, in which case the forward end 24 of the proper decimal indicator between those orders will be moved by the operator to active position. If the decimal point falls between the second and third denominational orders of the accumulator, the instant flash reading indicating means is shifted laterally to the left a distance equal to the width of one denominational order from its position of Fig. 1 to that illustrated in Fig. 2 in which the finger pieces 36 are disposed centrally of their slots 35. In that intermediate position of the flash reading indicating means, the sight apertures 18 in the first, second, sixth, seventh and eighth denominational orders are clear, and those in the remaining orders of the machine have portions of the colored strip 28 underlying them to visually distinguish the indicia displayed therein from those displayed in the clear sight apertures or windows. This color grouping of the numeral bearing elements illustrated in Fig. 2 is similar in denominational arrangement to that customarily employed but heretofore acquired by coloring the indicia on the numeral wheels in the first, second, sixth, seventh and eighth orders differently from those in the third, fourth, fifth, ninth, tenth and overflow orders. Shifting of the flash reading indicating means to its leftmost position illustrated in Fig. 3 will result in demominationally transposing the color grouping afforded thereby one order to the left of that illustrated in Fig. 2. Thus, if the decimal point in the answer or result registered in the accumulator will fall between the second and third, fifth and sixth, or eighth and ninth orders of the accumulator, the flash reading indicator means will be positioned as illustrated in Fig. 2. On the other hand, if such decimal point will fall between the third and fourth, sixth and seventh, or ninth and tenth denominational orders, the indicating means will be shifted to its leftmost position of Fig. 3. This latter position of the instant indicating means will also be employed where only whole numbers are being entered in the accumulator, so that the decimal point is disposed to the right of the lowest denominational order. It will thus be seen that regardless of where the decimal point falls with relation to the several orders of such a machine, the proper color grouping may be established to visually differentiate in the same manner in all cases between successive groups of three adjacent orders to the left of the decimal point. As previously explained, such visual indication is identical with that commonly employed in pointing off the various tens powers or denominational orders of any number being written by use of a decimal point and commas to the left of each third order above the decimal point. It will be understood that the term "pointing off" employed herein connotes proper placement of the decimal point and insertion of commas in the customary locations, as well as the comparable system employed in some other countries which use a comma for the decimal point and periods where we are accustomed to employing commas. Of course, the instant indicating mechanism may be employed for any other desired color grouping by varying the relative dimensions of the display portions of the colored strip, or by use of more than one colored strip or transparent strips of the same or different colors. In the device herein illustrated the strip 28 is shown as being colored green, although any other suitable or desired color may be employed.

As shown in Fig. 1, the lower or forward edge of the colored strip 28 terminates above or to the rear of the decimal openings 19, so that such openings and the decimal indicators with their forward ends 24 may be employed in customary manner independently of the instant flash reading indicating means. As illustrated in Figs. 6, 7 and 8, the colored strip 28 extends downwardly or forwardly a sufficient distance to underlie the several decimal openings 19. For this reason, the color indications by the indicator members 21 will be affected by the coloring of the strip 28, so that the indicating rear ends of members 21 may require different coloring to effect the desired indication.

A further modification is illustrated in Figs. 4 and 5 in which the decimal indicators 21 are dispensed with, but the decimal openings 19 in the casing 11, as illustrated in Figs. 1, 6, 7 and 10, are employed. The only difference in this construction of the flash reading indicating means from those previously described is in the configuration or dimensioning of the colored indicating strip or strips. As best seen in Fig. 5, attached to the slide member 34 is a colored strip of plastic material 41 having two depending end portions, the major part of each of which is of the same length or lateral dimension as the main part of a central cut-away portion, so that the same color grouping in sets of three denominational orders obtains as results with the previously described constructions. This is illustrated in Fig. 4, wherein the color grouping corresponds to that shown in Fig. 2. The lower corners of each of the two end portions of the colored strip 41 are extended outwardly and downwardly to provide corner tabs 42 (Fig. 5). This arrangement is such that each tab 42 underlies a decimal opening 19 (Fig. 4) adjacent and outwardly of each end of these two end portions of the colored strip 41. At the same time, the latter are notched at 43 in their lower edges to insure the remaining decimal openings 19 being cleared by the colored strip. With this arrangement, it is preferred that the lower edge portion of the clear plastic strip 27 which is seen through the decimal openings 19 be colored to correspond with the color of the outer surface of the casing 11. The colored strip 41 of the modification of Figs. 4 and 5 will effect the same grouping of the numeral bearing elements of the machine as does the previously described colored strip 28. In addition, the tabs 42 will effect visual indications of the proper location of the punctuation marks, both decimal points and commas, commonly employed in writing down the result or number registered by the accumulator, regardless of which of the several effective positions is assumed by this selectively movable flash reading indicator. Thus, as illustrated in Fig. 4, the position of the decimal point is indicated by the rightmost tab 42 being displayed in the decimal opening 19 between the second and third denominational order, and the proper positions of the commas normally employed in writing the results registered in the accumulator likewise are indicated as falling between the fifth and sixth and the eighth and ninth denominational orders. And such color grouping and pointing off indications may be denominationally transposed by lateral shifting of the finger pieces 36 in the same manner as previously described with relation to the other modifications illustrated.

The modifications of the instant invention shown in the drawings are dimensioned and arranged for use in a ten column decimal type calculating machine, but it is to be understood that these are merely illustrative and that use of the invention could equally well be made in different sizes and types of machines, including fractional and foreign currency calculating machines and all types of registers. Other color groupings than those illustrated, such as by sets of other than three, may also be employed as desired. And it is not intended to limit the invention to use in machines having a casing with individual sight apertures for each numeral bearing element, since it may be employed equally well in other machines, such as those in which a numeral wheel sight opening or window-providing cover is mounted directly on the inner frame structure and separate from the machine casing.

It is thought that the invention and many of its attendant advantages will be understood from the foregoing description, and it will be apparent that various changes may be made in the form, construction, and arrangement of the parts without departing from the spirit and scope of the invention or sacrificing all of its material advantages, the forms hereinbefore described being merely preferred embodiments thereof.

I claim:

1. In a machine of the class described, a register comprising a plurality of denominational orders of identically colored numeral bearing elements, a casing housing said register and having sight aperture means associated with said elements, and flash reading indicating means cooperating with said numeral bearing elements to visually point off any registration thereon, comprising a colored strip of transparent material mounted in visual alignment with said sight aperture means in certain denominational orders to differentiate between the numeral bearing elements in said certain orders and those in the remaining orders of said register, said colored transparent material being dimensioned to overlie discrete groups of adjacent numeral bearing elements to visually group the same and distinguish adjacent groups of register elements from each other and mounted for movement transversely of said register elements, and manually operable means connected to said colored strip for selectively moving the same to denominationally transpose the visual grouping of said register elements effected thereby.

2. In a decimal type calculating machine, an accumulator having a plurality of denominational orders of identically colored numeral wheels, a casing housing said accumulator and having sight apertures for said numeral wheels, and flash reading indicating means cooperating with said numeral wheels to visually point off any registration thereon to facilitate accurate reading thereof from left to right of the accumulator, comprising colored transparent material mounted adjacent said sight apertures in visual alignment with alternate ones of adjacent groups of three of said sight apertures to visually group those numeral wheels, for example, denominationally registering units, tens and hundreds, and millions, tens of millions, and hundreds of millions, and to visually distinguish the same from those numeral wheels registering decimal fractions, and thousands, tens of thousands, and hundreds of thousands, said colored transparent material being mounted for transverse shifting relative to said numeral wheels, and manually operable means connected to said colored transparent material for selectively shifting the same to denominationally transpose the visual grouping of said numeral wheels and their registrations.

3. A machine according to claim 2, wherein said casing is provided with indicator openings adjacent the lower left-hand corners of said numeral wheel sight apertures, and said colored transparent material is mounted interiorly of said casing and includes extensions underlying those of said indicator openings at each side of each of said alternate groups of three of said sight apertures.

4. In a machine of the class described, the combination of a plurality of denominational orders of similar numerical indicia bearing elements, a casing enclosing said elements and having open window means for displaying the same, clear transparent means for substantially sealing said window means, and flash reading indicating means, comprising colored transparent means interposed between certain of said elements and said window means to effect color grouping of said certain elements to visually distinguish the same from the remaining ones of said elements, said colored transparent means being shiftable laterally relative to said numerical indicia bearing elements, and manually operable means connected to said colored transparent means for selectively shifting the same to denominationally transpose the color grouping effected thereby.

5. A machine according to claim 4 wherein said casing is provided with decimal openings interposed between adjacent ones of said numerical indicia bearing elements, and portions of said colored transparent means visually align with those of said decimal openings outwardly adjacent to said certain elements to indicate the proper location of the punctuation marks commonly employed in writing down a number registered by said indicia bearing elements.

6. In a machine of the class described having a register comprising a plurality of denominational orders of numeral bearing elements, a casing having sight apertures aligned with said numeral bearing elements, and decimal indicators selectively operable to indicate the proper denominational location of the decimal point in any result registered by said elements, flash reading indicating means, comprising colored transparent means mounted on said casing for transverse movement relative to said numeral bearing elements and aligned with spaced groups of the latter and their sight apertures to effect color division of said register to facilitate flash reading thereof, and manually operable means connected to said colored transparent means for denominationally shifting the latter to selectively set the color division of said register in accordance with the location of the decimal point indicated by the operated said decimal indicator.

7. In a decimal type calculating machine having an accumulator with a plurality of denominational orders of identically colored numeral wheels, and a casing housing said accumulator and having sight apertures for said numeral wheels; flash reading indicating means cooperating with said numeral wheels to visually point off any registration thereon to facilitate accurate reading thereof from left to right of the accumulator, comprising a retaining frame mounted interiorly of the casing adjacent said sight apertures, a clear strip of transparent plastic material interposed between said casing and said retaining frame and supported by the latter to underlie said sight apertures, a colored strip of transparent plastic material interposed between said clear strip and said casing to underlie predetermined spaced groups of said sight apertures to differentiate between the numeral wheels in the associated denominational orders of said accumulator and those in the remaining orders thereof, and manually operable means connected to said colored strip and selectively operable to shift the latter laterally to underlie different ones of said sight apertures.

8. A machine according to claim 7, wherein said casing is provided with a slot extending longitudinally therethrough adjacent said sight apertures, and said manually operable means comprises a finger piece attached to said colored strip and extending upwardly through said slot, whereby lateral movement of said colored strip is limited by contact of said finger piece with the ends of said slot.

9. In a machine of the class described, the combination of denominational orders of identically colored numerical indicia bearing elements, window means for visually displaying said elements, and flash reading indicating means, comprising colored transparent means visually aligned with certain of said elements and said window means to effect color grouping of said certain elements to visually distinguish the same from the remaining ones of said elements, said colored transparent means being shiftable laterally relative to said numerical indicia bearing elements, and manually operable means connected to said colored transparent means for selectively shifting the same to denominationally transpose the color grouping effected thereby.

10. In a calculating machine, the combination of an accumulator having a plurality of denominational orders of wheels bearing numerals of the same color and operable to indicate calculation results, casing means housing said accumulator and having a plurality of sight apertures respectively aligned with said wheels, clear transparent strip means positioned on said casing means between all of said wheels and apertures and exposing said wheels to view through said apertures, and colored transparent strip means on said casing means overlying one or more sequences of the wheels in successive denominational orders of said wheels and interposed between said wheels and said sight apertures respectively aligned therewith for visually dividing said plurality of said wheels into distinguished wheel groups which are significant in reading the calculation results indicated by said wheels.

References Cited in the file of this patent

UNITED STATES PATENTS

| | | |
|---|---|---|
| 627,791 | Zeidler | June 27, 1899 |
| 789,410 | Swift | May 9, 1905 |
| 1,196,885 | Poole | Sept. 5, 1916 |
| 1,877,801 | Britten | Sept. 20, 1932 |
| 1,999,727 | Gubelmann | Apr. 30, 1935 |
| 2,346,601 | Niemann | Apr. 11, 1944 |
| 2,356,107 | Vogel | Aug. 15, 1944 |
| 2,549,512 | Neumann-Lezius et al. | Apr. 17, 1951 |
| 2,584,810 | O'Kane | Feb. 5, 1952 |